United States Patent Office 2,981,416
Patented Apr. 25, 1961

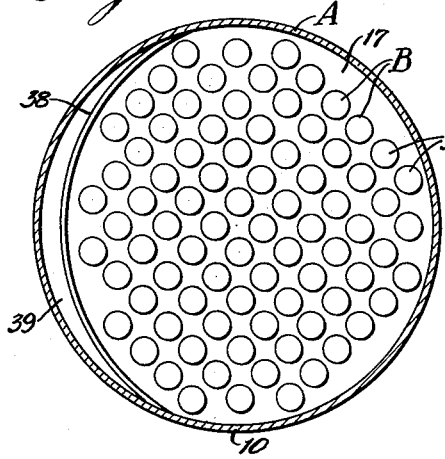
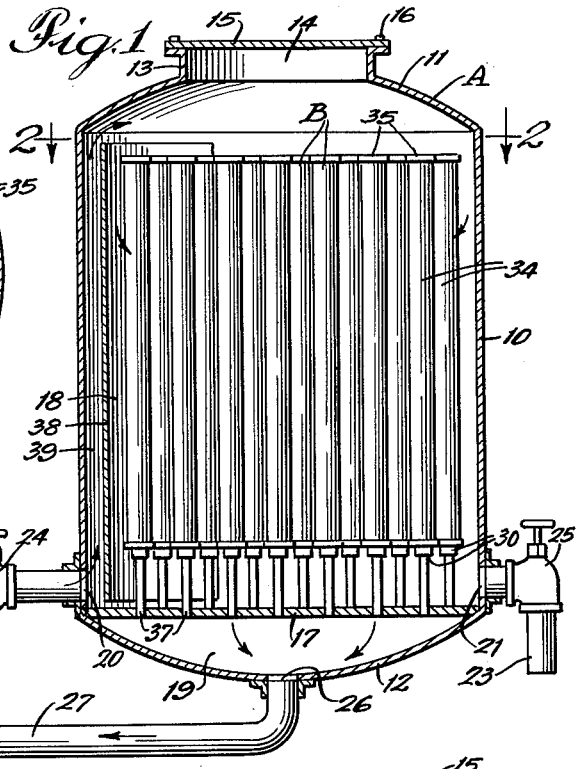
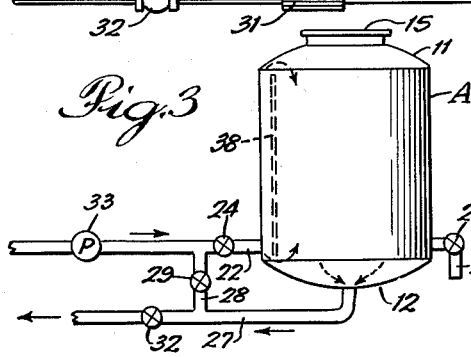
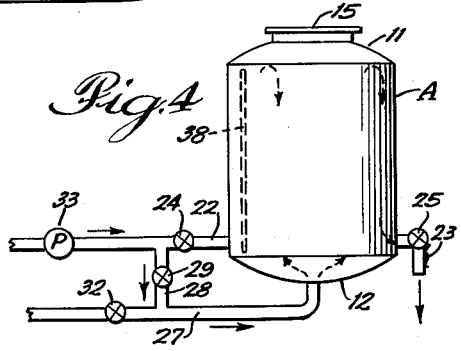
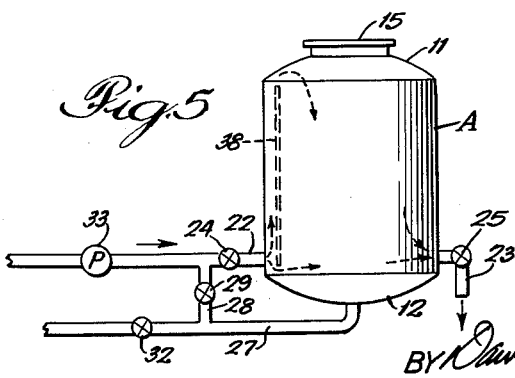

2,981,416

APPARATUS FOR THE CLEANING OF FILTERING EQUIPMENT

Joseph P. Lawlor, Ames, Iowa, assignor to General Filter Company, Ames, Iowa, a corporation of Iowa Filed Oct. 23, 1957, Ser. No. 691,827

2 Claims. (Cl. 210—333)

This invention relates to a structure for periodically cleaning a filtering apparatus, and more specifically, to an improved cleaning arrangement particularly suited for use in connection with diatomite filtering equipment for the filtration and purification of water and other liquids.

The present application is a continuation-in-part of my copending application Serial No. 585,057 filed May 15, 1956 and now abandoned.

Diatomite filtering equipment is widely used for the clarification and purification of water and other liquids such as syrups, varnishes, soaps, beverages, etc. Generally, a diatomite filtering apparatus consists of a plurality of elongated filter elements vertically disposed within a closed tank. Each of the filter elements is tubular and has small surface openings. The pressure of water flowing inwardly through these openings serves to hold a thin layer of diatomaceous material against the elements and it is this diatomite mass which operates to filter and purify the water passing therethrough.

Since the diatomaceous coating collects impurities from the water passing through it, it is apparent that periodic removal and replacement of the diatomite material is necessary in order to maintain effectiveness and efficiency of the filtering apparatus. Backwashing techniques, as disclosed in the aforementioned copending application, may be utilized in removing the used diatomite cake from each of the filter elements. However, it has been found that because of the rapid settling rate of the diatomaceous earth backwashing alone may be insufficient for complete removal of the used material, particularly where the filtering tank is of large size and is equipped with many filter elements. In such a case, it may become necessary to remove the tank's cover and some or all of the filter tubes so that a worker may hose down the tank interior and wash away the diatomite sediment.

Therefore, one of the main objects of the present invention is to provide an improved apparatus for overcoming the aforementioned defects and disadvantages of present structures. Another object is to provide an improved means for cleaning filtering equipment wherein the apparatus is successively, or simultaneously, backwashed and flushed to remove particulate matter therefrom. A further object is to provide means for directing wash water downwardly over the vertical filter elements while at the same time directing a horizontal stream across the lower portion of the tank. In this connection, it is a specific object to provide baffle means within the tank for directing the water without substantially affecting the filtering capacity of the apparatus. A still further object is to provide a means for removing diatomite material from filter elements by the internal and external application of water.

Other objects will appear from the specification and drawings in which:

Figure 1 is a broken sectional side view of a filtering apparatus embodying the present invention;

Figure 2 is a horizontal section of the filter tank taken along line 2—2 of Figure 1;

Figure 3 is a partly diagrammatic side view of the apparatus shown in reduced scale and illustrating the direction of water flow during normal filtering operation;

Figure 4 is a somewhat diagrammatic side elevation similar to Figure 3 but illustrating the direction of liquid flow during a backwashing step;

Figure 5 is a side elevational view similar to Figures 3 and 4 but showing the direction of flow during a flushing operation.

Referring to the drawings, Figure 1 shows a diatomite filter apparatus comprising a cylindrical tank A and a plurality of vertically arranged filter elements B mounted therein. The tank is provided with a cylindrical side wall 10, a dome-like top wall 11, and a convex bottom wall 12. The top wall is equipped with an upwardly and outwardly extending annular flange 13 which defines an opening 14 therethrough. A cover plate 15 is detachably secured to flange 13 by any suitable means, such as by connecting bolts 16.

Within tank A and adjacent the bottom wall thereof is a circular support plate 17 which divides the interior of the tank into a pair of chambers or compartments: a mixing or inlet chamber 18 above plate 17 and a lower outlet chamber 19 below the plate. The periphery of the plate sealingly engages the inside surface of the cylindrical side wall 10 and is preferably welded or otherwise secured to that wall. The tank wall adjacent the lower portion of the mixing chamber is provided with opposing inlet and outlet openings 20 and 21 communicating repsectively with the flow passages of inflow and outflow conduits 22 and 23. Each of these conduits is equipped with a flow control valve 24 and 25 respectively. While in the illustration given these valves are provided with handles for manual operation, it will be understood that automatic actuation means may be provided if desired.

As shown most clearly in Figure 1, the bottom wall of the tank is provided with a flow port or opening 26 and this opening places the lower chamber 19 in communication with the flow passage of a lower conduit 27. A by-pass conduit 28 equipped with a valve 29 extends between the conduits 22 and 27 and communicates therewith by means of unions 30 and 31. It will be noted that valve 24 is interposed along conduit 22 between the tank and the by-pass, and that conduit 27 is equipped with a valve 32 on the opposite side of the by-pass with reference to the filter tank. A suitable pump 33 is provided along passage 22 for directing raw water or other liquid to the filtering tank. Since such pumps are well-known in the art, a more detailed description is believed unnecessary herein.

Each of the filters B shown in Figures 1 and 2 comprises an outer tubular sleeve 34, upper and lower end plates 35 and 36 and a connecting member 37 threadedly secured at its lower end to plate 17. Preferably, the outer cylindrical sleeve of each vertical filter unit is formed from an elastic fabric such as nylon, vinyon, or any other porous cloth material having the desired qualities of flexibility and elasticity. Thus, the upper and lower chambers of the tank are in communication through the openings of the support plate 17 to which the connecting members are secured, and through the perforate sleeves 34 and tubular connectors 37 of the filtering elements. It is to be noted that the filter units B are maintained in elevated positions by the connecting members above the flow passages of conduits 22 and 23 where these conduits enter the mixing chamber 18. It will also be seen that when the filter units are mounted upon the upstanding connecting tubes within the mixing chamber, the upper ends of the filter units are spaced below the upper wall 11 of tank A (Figure 1).

Within the mixing chamber adjacent inlet 20 and spaced inwardly therefrom is a vertical partition or baffle 38 having a horizontal curvature slightly greater than the curvature of side wall 10. Preferably, the side edges of the curved partition are secured to the inner surface of the tank by welding or by any other suitable means, and the upper and lower edges of the partition are spaced above and below the end plates 35 and 36 of the filter units. However, it will be noted that the lower edge of the partition is spaced above support plate 17 and that the partition's upper edge is disposed well below the inner surface of cover 11. Thus, the partition 38 and side wall 10 define a crescent-shaped passage 39 (Figure 2) extending vertically within the mixing chamber for directing inflowing liquid upwardly within the tank so that it will spill over the partition's upper edge and over the filter elements. At the same time, a portion of the stream is directed below the partition horizontally below the partition and across the support plate. The arcuate nature of the partition and the crescent shape of the passage 39 provide a maximum distribution of water across the upper and lower portions of the tank while at the same time the partition and passage occupy a relatively small amount of space within the upper chamber. Consequently, the filtering capacity of the apparatus as determined by the number of vertical filter elements therein is substantially unaffected by the inclusion of the curved partition.

It will also be noted that since passage 39 is widest intermediate the side edges of the partition, a proportionately greater amount of water will flow below (and above) that partition across the central portion of the upper chamber. Thus, the greater proportion of the water flows towards the larger number of filter elements disposed between the inlet and outlet and gradually diminishing amounts flow to the decreasing number of units at greater distances from both the inlet and outlet. In this way, the curved partition and the crescent-shaped passage defined thereby tend to provide a substantially uniform distribution of raw water to the filter elements of the multi-cell unit.

Operation

In normal filtering operation, unfiltered water enters the mixing chamber from inflow conduit 22 and is diverted by the arcuate partition 38. A portion of the influent passes below the partition and becomes turbulent as it strikes the upstanding connecting members 37. Consequently, foreign particles or other material carried by the water are thoroughly mixed therewith. This water then flows upwardly within the mixing chamber and passes into the tubular filter elements B. At the same time, a proportion of the influent flows upwardly through passage 39 and passes over the top edge of the partition onto the upstanding filter elements. During this operation, valves 24 and 32 are opened while by-pass valve 29 and outlet valve 25 are closed. Consequently, during normal filtering operation the water follows the path of travel indicated by the broken arrows in Figure 3. As the raw water passes through the porous diatomite coating on elements B it is filtered thereby and then flows downwardly through the hollow elements into the lower chamber 19 and out through conduit 27 to a suitable reservoir (not shown). Pump 33 maintains a positive pressure within the filtering and mixing chamber 18 in order to increase the rate of filtration.

Since the coat of diatomaceous earth is the filter media which accomplishes the filtering result, it is apparent that the filter units must be cleaned and prepared for a new diatomite coating after a certain period of filtering has elapsed. This is accomplished by the backwashing and flushing operations illustrated in Figures 4 and 5 of the drawings. In the backwashing step, inlet valve 24 and valve 32 are closed while by-pass valve 29 and outlet valve 25 are opened. Therefore, the direction of flow through passage 27 and the filter elements is reversed. The inflowing water is forced under pressure into the filter units and then outwardly through the diatomite coating material and into chamber 18. As the internally introduced water flows outwardly through the diatomite coating, the elastic tubular sleeves 34 of the filter units expand outwardly to break and loosen the diatomite cake thereon. In this operation, a large proportion of the diatomite covering drops free from the sleeves and either settles to the bottom of the mixing chambers or passes outwardly through the effluent conduit 23 (Figure 4).

During the flushing step, valve 24 is again opened and valves 29 and 32 are closed. As the water passes upwardly through passage 39 and then downwardly over the filter elements, any residue of diatomite material remaining on the filter elements is externally flushed therefrom. The water passing below the partition between the inlet 20 and outlet 21 is distributed across plate 17 and sweeps away any sediment arising during the backwashing cycle. Support plate 17 is thereby washed free of diatomaceous material which would otherwise impair subsequent operation of the apparatus. Upstanding connecting tubes 37 serve to increase the efficiency of the flushing operation by producing turbulence in the lower portion of the mixing chamber so that sediment will be picked up and conveyed by the water to the outflow passage. The reduced diameter of tubes 37 as compared with the diameter of filter elements B provides less obstruction to the removal of the diatomite in the washing operation.

While the backwashing and flushing operation have been described as successive steps, it will be understood that both of these operations may be carried on simultaneously to produce substantially the same results. For combined backwashing and flushing, valves 24, 25 and 29 are left open while valve 32 is closed. In that case, the water flowing from pump 33 is divided into two streams and flows into the tank through passages 22 and 27.

After the cleaning operations are completed, valves 25 and 29 are closed and valves 24 and 32 are opened to direct the flow of water in the manner illustrated in Figure 3. A charge of diatomite is introduced into the influent water to provide a fresh coating upon the filter elements B. Here again, it will be noted that the spaced upstanding tubes 37 operate to agitate the water and insure an even diatomite coating upon the elements. When the coating is in place, filtering operations are again resumed.

When repair or replacement of any of the filter units is necessary, cover 15 is removed and the defective filter tube is simply unthreaded from its connecting member 37 and withdrawn from the tank. Since the filter units are not suspended or secured at their upper ends, they may be easily withdrawn through opening 14 after they are disconnected from the upstanding connecting tubes. Furthermore, it is to be noted that the tubes need not be removed in vertical position but that they may be tilted as they are lifted through the opening in the top wall 11. Hence, little headroom is required for installing or removing the filter element.

While in the foregoing specification I have set forth the present invention in considerable detail for purposes of illustration, it will be understood that such details may be varied considerably without departing from the spirit and scope of the invention.

I claim:
1. In a diatomite filter adapted for filtering water, a vertically-extending tank, a plate mounted in the lower portion of said tank and extending transversely thereacross, said plate providing a substantially flat upper surface, a plurality of vertically-extending tubular filter elements adapted to receive a coating of diatomite on the exterior surfaces thereof, said filter elements being positioned side-by-side within said tank above said plate and the lower end of each of said filter elements terminating at a spaced distance above said plate, a vertically-extending tube interposed between said plate and the lower end of each of said filter elements for supporting the filter elements on the plate and providing a passage from the inside of each filter element, said tubes being of substantially smaller diameter than said filter elements, and said tubes and said plate being constructed and arranged to provide a relatively open area immediately above said plate and beneath said filter elements, circumferentially-spaced inlet and drain pipes communicating with the said open area of said tank through inlet and drain openings located at the periphery of said area, said inlet opening being located at a level immediately above said plate, an outlet conduit communicating with said filter element passages for carrying filtered water therefrom during a filtering cycle and for directing water thereto during a backwashing cycle, valve means associated with said inlet pipe and outlet conduit for selectively directing the flow of water for said filtering and backwashing cycles, additional valve means in said drain pipe, whereby, water from said inlet opening may be directed through said open area across the upper surface of said plate to said drain opening for flushing away diatomite removed from said filter elements during said backwashing cycle.

2. The diatomite filter of claim 1 wherein there is also provided a vertically-extending partition positioned inwardly of the side wall of said tank between said water inlet opening and said filter elements and partially enclosing said filter elements, said partition terminating short of the top of said tank and also terminating short of said plate to provide a passage for the flow of water beneath said partition into said open area, and wherein said inlet and drain openings are positioned on opposite sides of said tank so that the water flowing under said partition from said inlet opening moves across said plate in the direction of said outlet opening.

References Cited in the file of this patent
UNITED STATES PATENTS

| | | |
|---|---|---|
| 581,324 | Wuichet | Apr. 27, 1897 |
| 654,592 | Barr | July 31, 1900 |
| 2,035,592 | Ehristensen | Mar. 31, 1936 |
| 2,300,789 | Kelley | Nov. 3, 1942 |
| 2,405,838 | Lawson et al. | Aug. 13, 1946 |
| 2,494,143 | Reed et al. | Jan. 10, 1950 |
| 2,693,882 | Olson et al. | Nov. 9, 1954 |
| 2,748,950 | Tursky | June 5, 1956 |
| 2,784,846 | Olson et al. | Mar. 12, 1957 |

FOREIGN PATENTS

| | | |
|---|---|---|
| 21,681 | Great Britain | 1894 |